Dec. 8, 1959     C. W. STIDGER     2,916,703
PHOTOELECTRIC SENSING DEVICE
Filed Aug. 14, 1956

INVENTOR.
CLIFFORD W. STIDGER
BY
Townsend and Townsend
ATTORNEYS

United States Patent Office 2,916,703
Patented Dec. 8, 1959

2,916,703
PHOTOELECTRIC SENSING DEVICE

Clifford W. Stidger, San Lorenzo, Calif., assignor to Gerber Products Company, Fremont, Mich., a corporation of Michigan Application August 14, 1956, Serial No. 603,980

10 Claims. (Cl. 331—66)

This invention relates to a photoelectric control device.

A principal object of this invention is to provide a completely self contained photoelectric sensing device which neither requires conductors for operating power or for the transmission of signals so that the device may be mounted in locations where wiring would be difficult to install or subject to deterioration by environmental conditions and in addition to provide the photosensitive device with means for indicating orientation of articles on an assembly line as they pass a sensing point.

Photoelectric cell sensing devices when used in many industrial applications are subject to ambient temperature and high humidity often detrimental to the proper functioning and long life of the cells and electronic components associated therewith. In other applications where there is an explosive atmosphere no high voltages can be employed which could develop a spark.

A feature and advantage of this invention is that the novel photosensing device herein shown may be entirely enclosed in an evacuated, oil filled or sealed container so the component parts are protected from temperature and humidity variations external to the container. The sensing device by a novel means is supplied with operating current by an external light source so that neither stored power or power connection need be used and the device transmits a signal which may be picked up by a receiving unit by inductance without the aid of any external interconnecting conductors.

A feature of this invention is that the photoelectric sensing device is enabled to function as a conventional photoelectric sensing device or can indicate if an article passing the sensing station has its leading or trailing edge in parallel registration with the orientation of two photosensitive units mounted in the photosensing device. Thus the present device is useful for example in applications where jars or cans are traveling on an assembly line to a location where they are to be filled with food and the like. If the cans are tilted or tipped as they pass the sensing point they will be sufficiently out of registration with the two photosensitive station units so that the photosensitive station is enabled to indicate such by a suitable signal.

A feature of this invention is that the photosensing device may be installed and replaced without making or breaking any electrical connections.

Other objects of the present invention will become apparent upon reading the following specification and referring to the accompanying drawings in which similar characters of reference represent corresponding parts in each of the several views.

Figure 1:
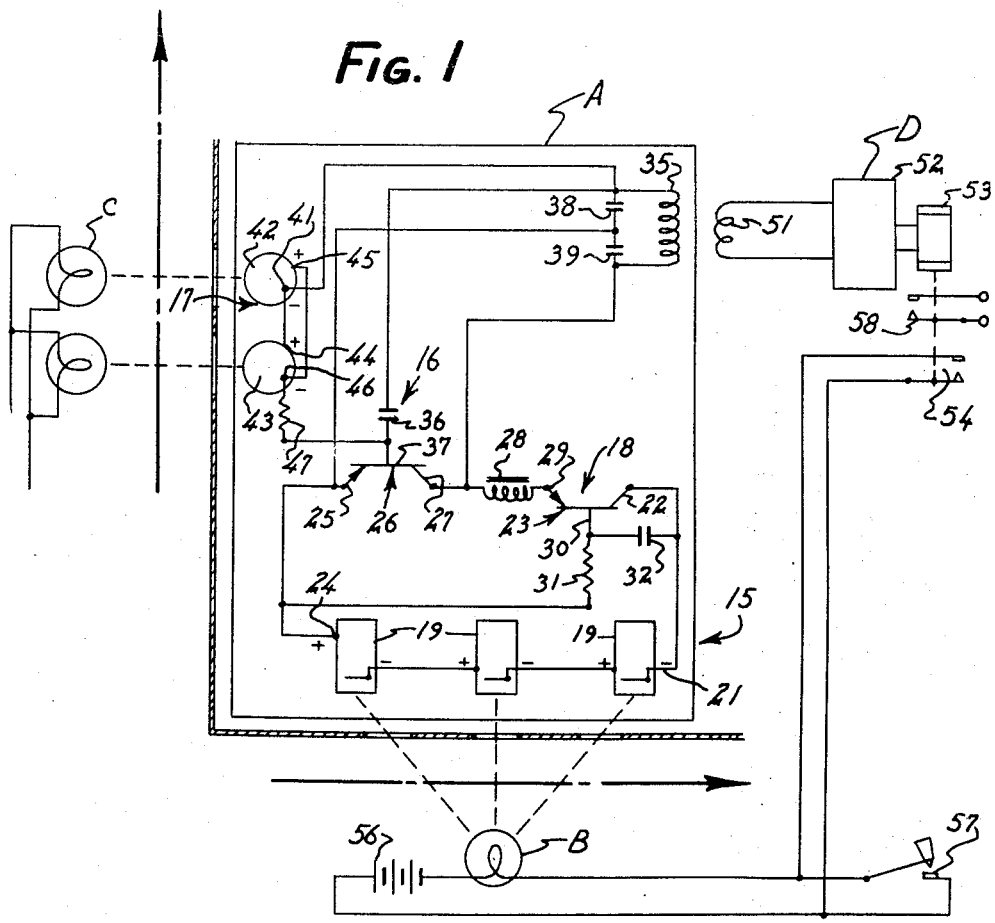
Fig. 1 is a schematic view of one embodiment of the invention.

In the preferred embodiment of the invention as shown in Fig. 1 there is provided a photosensitive signal emitting device A, a light source B mounted exteriorly of said device A to supply energy to power said device, a light source C mounted exteriorly of said device A to control output of the device and a pickup element, detector and amplifying circuit D also mounted exteriorly of said device A to receive signals from the device A, and, in turn, control light source B in response to the presence or absence of signals emitted from device A.

The photosensing device A may be mounted in a sealed container such as a small jar or other glass envelope. The device A, for example, may be permanently enclosed in envelopes of the type used conventionally for vacuum tubes. The circuit for the photosensing device comprises a photopowered power supply 15 to supply operating current for the device A, a Colpitts oscillator 16, a photosensitive station 17 arranged to control oscillation of the oscillator 16, and a transistor current regulating circuit 18 to regulate current from power source 15 and stabilize oscillator 16.

The photopowered power supply 15 comprises three serially connected selenium photocells 19 which are arranged when subjected to a light source of sufficient intensity to produce an output current of sufficient power to operate the oscillator 16. The negative terminal 21 of the power source 15 is connected to a collector electrode 22 of transistor 23, of current regulator 18 and the positive terminal 24 connects to emitter electrode 25 of transistor 26 of oscillator 16. Collector 27 of transistor 26 is connected through an isolating choke 28 to the emitter electrode 29 of transistor 23 to complete the collector-emitter operating power connections to transistors 26 and 23.

Base electrode 30 of transistors 23 is connected by a resistor 31 to positive terminal 24 and by a condenser 32 to the negative terminal 21. When light is initially applied to photocells 19 there is an initial current surge which first passes through condenser 32 to base electrode 30 to render the base sufficiently negative to cause transistor 23 to be conductive, wherein momentarily operating current is available for oscillator 16. Thereafter unless oscillator 16 starts oscillating base electrode 30 is rendered positive through resistor 31 so that transistor 23 is nonconductive.

Oscillator 16 is tuned by a coil or inductance 35 connected to collector 27 and through the photosensing station 17 and a resistor 47 bypassed by condenser 36 to the base electrode 37 of transistor 26. Two condensers 38 and 39 are across coil 35 and joined to connect the emitter 25.

The photosensitive station 17 has two photoelectric cells 42 and 43 arranged with positive terminal 45 of cell 42 connected to the negative terminal 46 of cell 43 and the negative terminal 41 of cell 42 connected to the positive terminal 44 of cell 43 so that the two cells tend to cancel each other.

Positive terminal 45 connects to coil 35 and negative terminal 46 connects through resistor 47 to base electrode 37.

This circuit completes a Colpitts oscillator with the photocells being in the base bias circuit of the oscillator. When light first shines on the power section 15 there is an initial surge of negative current on base electrode 30 which momentarily renders transistor 23 conductive to supply operating current to oscillator 16. When equal light is shining on photocells 42 and 43 the photocells cancel and function as pure resistance which renders the oscillator in condition to oscillate.

The oscillator then immediately begins to oscillate wherein transistor 26 fluctuates between a condition of full conductivity to a condition of nonconductivity. This change causes a fluctuation in the current drawn from supply source 15. The fluctuation is seen by condenser 32 and then passed to base electrode 30 to bring the base negative and provide operating current for oscillator 16.

Current regulation is effected by changes of bias on base 30 by an increase or decrease of positive current on base electrode 30 through resistor 31. Voltage increase or decrease of power source 15 varies the bias on base 30 so a reduction or increase of voltage produced by power source 15 lowers or raises the positive bias of base 30 to render transistor 23 substantially more or less conductive when the negative pulses from condenser 32 are applied to the base 30. This tends to effect a regulation of supply current for the oscillator 16 within a wide degree of variation of voltage output from the photoelectric power supply 15.

This is important in applications where the light shining on the photocells 19 is subject to variation because of changes in ambient conditions. For example, steam may exist momentarily between light source B and photocells 19 which could possibly cause an error in the oscillator circuit 16. With the regulation effected by regulation circuit 18, however, there is maintained a substantially constant operating current.

When photocells 42 and 43 are jointly subject to an identical illuminated condition they function substantially as pure resistance. The voltages produced by each cell in such case is completely cancelled by the other cell. When light shines more on photocell 42 than on photocell 43 base electrode 37 is rendered somewhat more positive. This does not effect the function of the oscillator unless the current is high enough to keep the base down to cut off, which it usually would not be, because there is sufficient negative current available from power supply 15 to continue the oscillator 16 in oscillation. When light however shines on photocell 43 more than photocell 42 the base 37 is rendered substantially more negative. This biases the base to a point above saturation so that oscillator 16 is unable to oscillate and immediately goes out of oscillation. When this happens there is no fluctuating current to pass through condenser 32 so that voltage regulating circuit 18 is immediately rendered nonconductive by the circuit's positive bias potential through resistor 31. The voltage regulating circuit 18 remains in nonconductive condition thereafter regardless of subsequent changes of illumination on photocells 42 or 43.

The pickup circuit D is arranged with an electromagnetic induction pickup coil 51 arranged near enough to the inductance 35 to pick up oscillation signals by inductance from coil 35. The signal is detected and amplified by an amplifier 52 which operates a relay 53 while a signal is being received from pickup 51. The amplifier 52 and inductance 51 are both of conventional design.

When relay 53 is energized contact points 54 are closed to energize the light source B through a power source 56. Thus in normal operation as long as oscillator 16 is in operation contact points 54 will be closed and light B will remain illuminated. However upon cessation of oscillation of the oscillator, relay 53 will be de-energized thus causing contact points 54 to open causing light source B to be turned off.

A manual push button switch 57 is provided in parallel with contact points 54 so that when it is desired to again start the system in operation switch 57 is depressed causing light B to turn on. This energizes photoelectric power source 15 so there is an initial surge of negative current on base electrode 30 of transistor 23. If the light source in the photoelectric sensing element 17 is correct for oscillation oscillator 16 will oscillate, relay 53 will be energized to hold contact points 54 in contact and light source B will remain illuminated.

In practical application if the two photocells 42 and 43 are placed in vertical alignment with respect to each other and two light sources C are placed in co-planar alignment adjacent the two photocells and are arranged to shine with equal intensity on the photocells 42 and 43 the device will remain in oscillation. A conveyor belt may be placed immediately under the two photocells 42 and 43 between the light source and the cells. Cans or jars may then be arranged on the conveyor to interrupt light to photocells 42 and 43 as they move along on the belt. As long as the cans or jars leading and trailing edge is in parallel alignment with the vertical alignment of the photocells 42 and 43 the change of light to each cell of the pair will be identical so oscillator 16 will remain in oscillation. Should a can or jar be tipped the light source on photocell 43 would be greater on either the leading or the trailing edge, depending on the angle of tilt of the can and the oscillator will go out of oscillation. Relay 53 is arranged with contact points 58 to control the conveyor belt or to initiate a warning signal when the relay is de-energized so that an attendant may act to straighten or remove the misregistered can or jar.

It is to be appreciated that the entire photosensitive device has no physical connection with any of its associated elements. Light source B functions to supply the full power to operate the device, light source C functions as the signal power source while pickup 51 is arranged to pick up the signal emitted from the photosensitive device by inductance.

Figure 2:
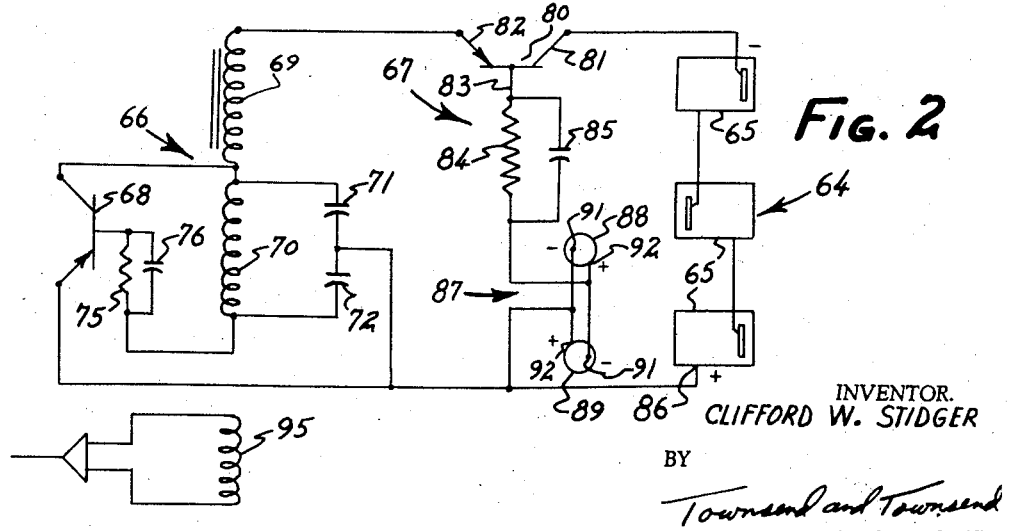
Fig. 2 is a schematic view of a modification of the embodiment of Fig. 1.

Referring now to Fig. 2 there is shown a modification of the device of Fig. 1. The circuit includes a power source 64 including serially connected photocells 65, a Colpitts oscillator 66 and a control circuit 67. The oscillator includes a transistor 68, a choke 69, a tuned inductance 70, bypassed by two condensers 71 and 72 and a base electrode leak circuit including a resistor 75 and condenser 76.

As long as proper operating current is applied to the oscillator 66 the latter will oscillate. Dropping the current below the operating value will cause the oscillator to cease to oscillate. Control circuit 67 is arranged to control the oscillator current to cause it to drop in and fall out of oscillation. Control circuit 67 has a transistor 80 with its collector 81 and emitter 82 serially connected in the oscillator 66 collector power circuit. The base electrode 83 of transistor 80 is connected through a resistance 84 bypassed by a condenser 85 to a positive terminal 86 of power source 64 through a photosensitive control 87. Control 87 includes two photocells 88 and 89 connected with the negative terminal 91 of each cell connected to the positive terminal 92 of the other cell.

When light shines equally on the photocells 88 and 89 the cells function as resistance because of their canceling relationship and there is a positive potential applied on base 83. The positive potential on base 83 renders transistor 80 nonconductive so that the current to oscillator 66 is below operating value wherein the oscillator 66 is unable to oscillate. When light shines more on photocell 88 than cell 89 still more positive current is applied on base 83 rendering the oscillator 66 in substantially the same inoperative condition. When more light is arranged to shine on photocell 89 than cell 88 there is a negative potential developed on base 83 thus rendering transistor 80 conductive so that oscillator 66 is supplied with operating current and immediately starts to oscillate. A pickup coil 95 substantially identical to coil 51 hereinbefore described in connection with Fig. 1 is arranged near coil 70 to pick up the oscillating signals generated by oscillator 66. It is apparent in this circuit that the two photocells 88 and 89 could be operated as photocells 43 and 42 to determine malalignment of passing cans or jars. However it is also apparent that the device may be used as a single cell photocell sensing unit for conventional operation. In such use photocell 88 is covered so light can be shown only on photocell 89. Interruption of light to photocell 89 then causes the oscillator to cease oscillation. With this device a counter or other control device could be operated by the signals from pickup coil 95.

In this disclosure the oscillators 66 and 16 have been described as Colpitt type oscillators. However it is apparent that oscillators of many other designs such as Hartley and the like may be used with equal effectiveness.

Although the foregoing invention has been described in some detail by way of illustration and example for purposes of clarity of understanding, it is understood that certain changes and modifications may be practiced within the spirit of the invention as limited only by the scope of the appended claims.

It is claimed:

1. In a photosensitive device the combination of an oscillator, means to supply said oscillator with operating current, and photosensitive means including two photosensing units each connected in parallel cancelling relation with respect to the other to produce a combined current flow in one of two directions, said photosensitive means being connected with said oscillator to bias said oscillator in an operative condition when said photosensitive means produces current in a first direction and bias said oscillator in an inoperative saturated condition when said photosensitive means produces current in the other direction.

2. In a light responsive device the combination of an oscillator, a light energized power source to supply operating current for said oscillator, a current regulating means to stabilize the operating current for said oscillator, photosensitive means arranged to produce output current to control the oscillator to render said oscillator operative and inoperative in response to the condition of light energization of said photosensitive means, said voltage regulating means including means operative to supply operating current to said oscillator upon energization of said power source and operative to interrupt the operating current when said oscillator is in the inoperative condition, first light source means to energize said power source, said light source means being shielded to prevent the light source from energizing said photosensitive means, second light source means to energize said photosensitive means, an inductive pickup means operative to indicate the operative condition of said oscillator, first control means for said first light source means operable to render said first light source means inoperative when said oscillator is indicated to be in inoperative condition, and second control means for said first light source means operable to actuate said light source independent of the operative condition of said first control means.

3. In a light responsive device the combination of an oscillator, a light energized power source to supply operating current for said oscillator, a current regulating means to stabilize the operating current for said oscillator operative to supply operating current to a said oscillator upon energization of said power source and interrupt operating current to said oscillator when said oscillator is inoperative, said regulating means comprising a semiconductive element having a collector, emitter and base electrode, supply current for said oscillator arranged to pass between said emitter and said collector electrode, means biasing the base electrode to render the element nonconductive, capacity means arranged to supply said base with current of an opposite polarity sufficiently greater than the bias current to render said element conductive during fluctuation of supply current, whereby said bias means is operable to vary the degree of conductivity of said element inversely with fluctuation of current from said power source during oscillation of said oscillator, photosensitive means arranged to produce an output current of sufficient intensity to saturate said oscillator and render it inoperative in response to being energized by light, light source means to energize said power source, inductive means to indicate the operative condition of said oscillator, light control means operable to render said light source means inoperative when said oscillator is indicated to be in the inoperative condition and second light control means to actuate said light source means to energize said power source and start oscillation of said oscillator, and second light source means to energize said photosensitive means to stop oscillation of said oscillator.

4. A device according to claim 3 and wherein said photosensitive unit comprises two photoelectric cells connected together in current cancelling relation to produce a current to saturate said oscillator upon one cell being energized by light more than the other, and said second light source means arranged to normally equally energize each said cell whereby oscillation of said oscillator is interrupted upon light source to one of said photocells being reduced with respect to the other.

5. In a light responsive device the combination of a self-contained unit including an oscillator operable to produce electromagnetic radiation exteriorly of said unit, a light energized power source to supply operating current for said oscillator, photosensitive oscillator control means arranged to alternatively produce first oscillator control current to render said oscillator in an operative condition when energized by light of a first value and second oscillator control current to render said oscillator in an inoperative condition when energized by light of a second value; energizing means for said light responsive unit including a first light source positioned and arranged exteriorly of said unit to energize said power source, a second light source positioned and arranged exteriorly of said unit to energize said control means with light of alternative first and second values; and an inductive pickup positioned and arranged exteriorly of said unit within the range of electromagnetic radiation produced by said oscillator to sense electromagnetic radiation produced by said oscillator and register the condition of said oscillator in said operative and inoperative conditions of operation.

6. In a photosensitive device the combination of an oscillator, means to supply said oscillator with operating current, regulating means to regulate the operating current for said oscillator, a control element for said regulating means operable to cause said regulating means to interrupt operating current for said oscillator, and photosensitive means connected to said control element and oscillator including two photosensing units each arranged in cancelling relation with respect to the other to produce a combined current flow in one of two directions, said control element operable to interrupt current flow to said oscillator when said photosensitive means is energized to cause current flow in a selected one of the two said directions of current flow output from said photosensitive means.

7. In a light responsive device the combination of an oscillator, a light energized power source to supply operating current for said oscillator, current regulating means to stabilize the operating current for said oscillator, said current regulating means having a first condition of operation wherein said oscillator is supplied with operating current and a second condition of operation wherein said oscillator is supplied with current below operating level, photosensitizing means arranged to produce output current to select the condition of operation of said current regulating means according to the condition of light energization of said photosensitive means, said photosensitive means including two photocells each arranged to produce an output current when energized by a light source, said photocells connected together in current cancelling relation to provide a resultant current flow in one of two directions determinative upon which of said two cells receives the greater light energization, and said photosensitive means operable to render said current regulating means in the first condition of operation when said photosensitive means is energized to produce current flow in one direction and to cause said current regulating means to be in said second condition of operation when said photosensitive means is energized to produce current flow in the other direction.

8. The combination of an oscillator, a light energized power source to supply operating current for said oscillator, current regulating means to stabilize the operating current for said oscillator, said current regulating means having a first condition of operation wherein said oscillator is supplied with operating current and a second condition of operation wherein said oscillator is supplied with current below operating level, and photosensitive means connected to said regulating means and operable to cause said regulating means to be alternatively in the first and second conditions of operation according to the condition of light energization of said photosensitive means.

9. In a light responsive device the combination of an oscillator, a power source to supply operating current for said oscillator, current regulating means to stabilize the operating current for said oscillator, said regulating means including gate means operable to interrupt operating current to said oscillator when said oscillator is in the inoperative condition, said regulating and gate means comprising a semi-conductive element having a collector, emitter and base electrode, said semi-conductive device connected serially between said power source and said oscillator to pass current through said base between said emitter and collector electrodes, biasing means to bias said base electrode to render said semi-conductive element normally nonconductive, means coupling said oscillator and said base electrode to supply said base electrode with pulses of current sufficient to render said semi-conductive element conductive in phase relation to said oscillator whereby said oscillator is continually supplied with said operating current while said oscillator is in operative condition, oscillator control means connected to said oscillator and operative to cause said oscillator to momentarily cease oscillation whereby said gate means is operative to interrupt operating current for said oscillator.

10. A light responsive device according to claim 5 including means to prevent light from said first light source from energizing said oscillator control means.

References Cited in the file of this patent

UNITED STATES PATENTS

| 2,413,076 | Schick | Dec. 24, 1946 |
| 2,728,049 | Riddle | Dec. 20, 1955 |
| 2,772,359 | Modiano | Nov. 27, 1956 |
| 2,773,220 | Aron | Dec. 4, 1956 |
| 2,817,819 | Chamberlain | Dec. 24, 1957 |

FOREIGN PATENTS

| 530,456 | Great Britain | Dec. 12, 1940 |

OTHER REFERENCES

"Transistor Oscillator Is Powered by Light," by Turner, page 66 of Radio Electronics for August 1953.

"Transistor Circuit Handbook," by Garner, copyrighted 1956, page 84 (Fig. 5–6(c)).